March 30, 1937  R. C. HAMILTON  2,075,645
SEALED BEARING
Filed Sept. 21, 1935
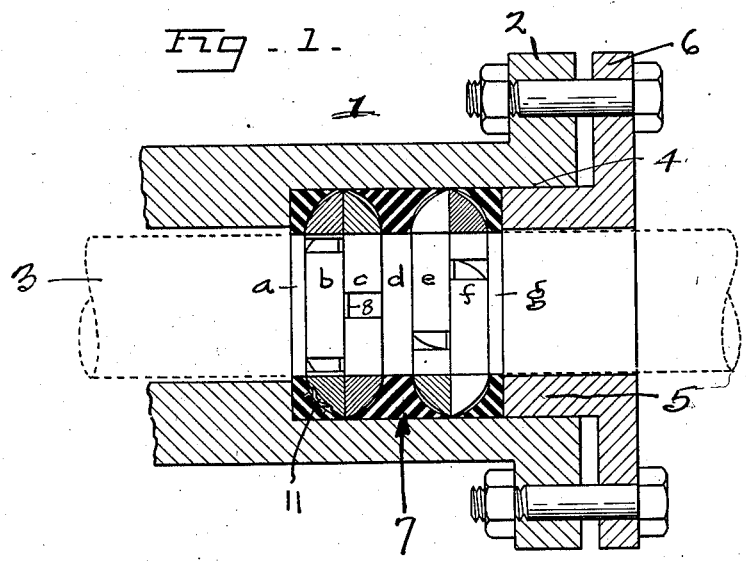
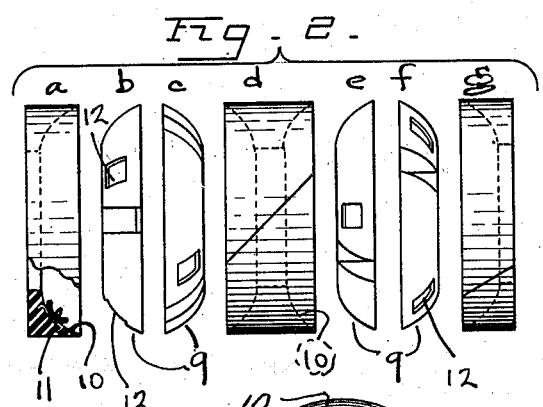
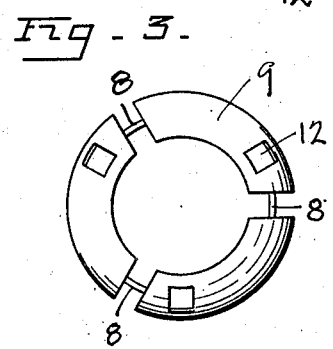 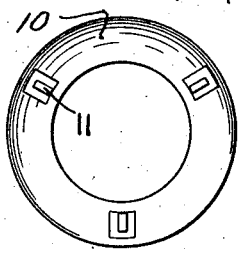
INVENTOR.
Roy C. Hamilton
BY
ATTORNEY.

Patented Mar. 30, 1937

2,075,645

UNITED STATES PATENT OFFICE 2,075,645

SEALED BEARING

Roy C. Hamilton, San Francisco, Calif.

Application September 21, 1935, Serial No. 41,591

2 Claims. (Cl. 308—36.2)

This invention relates to an automatic adjustable packing element for shaft bearings and the like.

An object of the invention is to provide a packing element consisting of individual layers or laminations of rubber, or a compound of rubber, and a bearing metal, such as Babbitt or other similar metal composition.

A further object of the invention is to provide a packing and bearing element consisting of metallic rings interrupted throughout the circumference thereof, to support the shaft in operative position in a bearing, said rings being supported in cushioning elements which are free to yield and to adjust themselves to support the shaft in any and all out-of-line positions said shaft may assume during its operative moments.

Other objects and advantages of the invention are to provide an automatic adjustable packing element for shaft bearings and the like that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying drawing:

Fig. 1 represents a cross section through a shaft bearing wherein the shaft is supported in a packing bearing constructed in accordance with my invention.

Fig. 2, a, b, c, d, e, f and g, is a side elevation of the various elements constituting my packing bearing in supported relationship.

Fig. 3 is a front elevation of one of the metallic bearing rings.

Fig. 4 is a front elevation of one of the rubber rings for supporting the metal bearing ring.

In detail the construction illustrated in the drawing comprises a bearing or packing box generally designated by the numeral 1, having a flange 2 at one end thereof, said box or bearing 1 being provided with a central opening therethrough in which a shaft 3 is confined. The inside of the bearing or box adjacent the flanged portion 2 thereof, has an enlarged bore 4 into which, at the outer end thereof, the gland 5 is adapted to be received, said gland having a flange 6 thereon which is adapted to be connected to the flange 2 by a bolt or other equivalent fastening means.

Within the enlarged bore 4 of the box 1 and behind the gland 5, I have provided a laminated or layered packing element generally designated by the numeral 7. Each packing bearing consists of a plurality of elements formed respectively of rubber and metal. The metal portions of the packing bearing 7 constitute the sole means of support for the shaft 3 in its rotative movements, whereby said shaft does not depend for its support upon either the box 1 or the gland 5.

In Fig. 1, I have shown the packing bearing consisting of two pairs of metal rings denominated respectively b—c and e—f. The metal rings b—c and e—f lie in face to face contact, and each have an opening centrally therethrough which corresponds approximately to the shaft diameter. The external diameter of said metal rings is less than that of the bore 4 whereby the said metal rings are free to move within said bore 4. Each of the rings b, c, e and f is divided circumferentially into three or more segments, and said segments are connected by a wire 8 which is embedded therein during the process of molding or casting the same. The wires 8 serve to hold the segments in the desired circumferential relation, yet are of sufficient elasticity to permit the segments to yield circumferentially in order to adjust themselves to a fit with the shaft 3. The outer rearward face of each of the rings b—c and e—f, is finished off on a curve or bevel designated by the numeral 9, to permit each pair of rings b—c and e—f to adjust themselves in a position in the mounting slightly off a right angle to the axis of the bore through the box 1.

Each of the pairs of rings b—c and e—f are supported in rings of rubber or a compound of rubber indicated by the respective numerals a, d and g, the rings a and g being positioned as the endmost elements of the packing bearing, and the ring d in the center of the bearing, to support and cushion the metal rings b—c and e—f. Each of the rubber members a, d and g on the sides thereof facing the pairs of metal rings b—c and e—f, is provided with curved or cup shaped cavities therein designated by the numeral 10, within which the curved exteriors of the metal rings b—c and e—f may be received. The curvature 10 in each rubber ring substantially conforms to the outside curvature of each metal ring so that the said metal rings may oscillate or yield in a manner which will most accurately accommodate them to the axial position of the shaft 3.

In the face of the curved cavity 10 of each of the members a, d, g, at spaced points throughout the circumference thereof, I have provided extruding, flat, curved, metal springs 11 and on the curved outer face of each of the pairs of metal rings b—c and e—f, I have provided corresponding recesses 12. Thus, when the metal rings b—c and e—f are seated in the box or cavities of the rubber rings a, d and g, the springs 11 will seat in the recess 12 and tend to force the segments of the metal rings b—c and e—f tightly into contact with the exterior of the shaft at all times. The pressure which may be exerted by the springs 11 is sufficient to overcome the tension of the elements 8 which hold the various segments of the metal rings together, so that the said springs will be capable of thrusting the segments of the metal rings into working contact with the shaft exterior at all times.

Tension is created on the rubber members, a, d and g, by tightening the gland 5, which thus prevents any leakage or by-passing of oil, water, steam or the like. The rubber rings a, d and g are split transversely as at 13 to facilitate their being installed in operative position in the bearing box. When the rubber rings a, d and g are tightly compressed in the bore 4 by the gland 5, they become of such rigidity and stiffness as to cause the springs 11 to thrust outwardly at a 45° angle against the face of the metal rings b—c and e—f, and thus tightly force the inner bore of said metal rings into contact with the outer circumference of the shaft 3. In instances where a relatively loose fit of the shaft 3 is desirable, my packing bearing will compensate for any position that the shaft may assume, and at the same time will cooperate with the shaft in that position and support the same throughout all of its operative movements.

Having thus described this invention, what I claim and desire to secure by Letters Patent is:

1. A bearing including a box and a gland having a shaft rotatably journaled therein; a packing element in said box and around said shaft consisting of alternate rings of metal and rubber, said metal rings having the outer circumference curved and divided circumferentially into segments and supporting the shaft and said rubber rings resiliently supporting the metal rings and having springs arranged thereon at spaced points throughout the circumference thereof to bear against the segments of the metal rings to thrust the same toward the shaft whereby the shaft axis may assume a position not in coincidence with the axis of the box and gland.

2. A bearing including a box and a gland having a shaft rotatably journaled therein; a packing element in said box and around said shaft consisting of alternate pairs of rings of metal and single rings of rubber, said metal rings having the outer circumference curved and divided circumferentially into segments and supporting the shaft and said rubber rings resiliently supporting the metal rings and having springs arranged thereon at spaced points throughout the circumference thereof to bear against the segments of the metal rings to thrust the same toward the shaft whereby the shaft axis may assume a position not in coincidence with the axis of the box and gland.

ROY C. HAMILTON.